US009386051B2

(12) United States Patent
Hoshino et al.

(10) Patent No.: US 9,386,051 B2
(45) Date of Patent: Jul. 5, 2016

(54) INFORMATION SHARING SYSTEM, COMMON TERMINAL AND NON-TRANSITORY COMPUTER-READABLE STORAGE MEDIUM

(71) Applicant: KONICA MINOLTA, INC., Tokyo (JP)

(72) Inventors: Noriko Hoshino, Tokyo (JP); Takao Shudo, Tokyo (JP); Shunsuke Takamura, Tokyo (JP); Shinya Ogino, Tokyo (JP); Toshihiro Motoi, Tokyo (JP); Yoichi Kawabuchi, Hyogo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 239 days.

(21) Appl. No.: 14/024,270

(22) Filed: Sep. 11, 2013

(65) Prior Publication Data

US 2014/0082077 A1 Mar. 20, 2014

(30) Foreign Application Priority Data

Sep. 14, 2012 (JP) ................................ 2012-202474

(51) Int. Cl.
*G06F 15/16* (2006.01)
*H04L 29/06* (2006.01)

(52) U.S. Cl.
CPC .......... *H04L 65/403* (2013.01); *H04L 65/1073* (2013.01)

(58) Field of Classification Search
CPC ..................... H04L 65/1073; H04L 65/403
See application file for complete search history.

(56) References Cited

U.S. PATENT DOCUMENTS 8,719,845 B2 * 5/2014 Augustine ............... G06F 9/526
718/1
8,769,012 B1 * 7/2014 Shah et al. .................... 709/204
(Continued)

FOREIGN PATENT DOCUMENTS

JP 03-257518 A 11/1991
JP 10-108154 4/1998
(Continued)

OTHER PUBLICATIONS

Office Action (Notification of Reasons for Refusal) issued on Nov. 11, 2014, by the Japanese Patent Office in corresponding Japanese Patent Application No. 2012-202474, and an English translation of the Office Action. (6 pages).
(Continued)

*Primary Examiner* — Jonathan Bui
(74) *Attorney, Agent, or Firm* — Buchanan Ingersoll & Rooney PC

(57) ABSTRACT

There are provided an information sharing system, a common terminal and a non-transitory computer-readable storage medium storing an information sharing program. An information sharing system includes: a common terminal; and one or more personal terminals each configured to transmit an object to the common terminal and perform a remote operation on an object displayed on a common screen. The common terminal includes a receiving section configured to receive an object transmitted from one of the personal terminals, a display section including the common screen and being configured to display the object on the common screen, and a control section configured to determine, upon receiving an instruction to perform a remote operation on an object displayed on the common screen, whether the instruction satisfies a predetermined condition or not, and prohibit performing the remote operation in response to a determination that the instruction does not satisfy the predetermined condition.

21 Claims, 5 Drawing Sheets

(56) References Cited

U.S. PATENT DOCUMENTS

| | | | |
|---|---|---|---|
| 9,002,890 B2* | 4/2015 | Price | G06F 21/6218 707/783 |
| 2005/0097440 A1* | 5/2005 | Lusk et al. | 715/500.1 |
| 2005/0138566 A1* | 6/2005 | Muller | G06Q 10/00 715/759 |
| 2006/0099988 A1* | 5/2006 | Velagaleti et al. | 455/552.1 |
| 2009/0070540 A1* | 3/2009 | Dewa | H04H 60/73 711/163 |
| 2010/0134385 A1* | 6/2010 | Roth et al. | 345/2.3 |
| 2011/0185008 A1* | 7/2011 | Tuan et al. | 709/202 |
| 2011/0197263 A1* | 8/2011 | Stinson, III | 726/4 |
| 2012/0154255 A1* | 6/2012 | Hinckley et al. | 345/1.3 |
| 2012/0286924 A1* | 11/2012 | Goto | G05B 15/02 340/4.31 |
| 2013/0111326 A1* | 5/2013 | Lockhart et al. | 715/234 |
| 2013/0326330 A1* | 12/2013 | Harris et al. | 715/234 |
| 2014/0040178 A1* | 2/2014 | Sherman | G06Q 10/103 706/47 |
| 2014/0067995 A1* | 3/2014 | Schachtel | G06Q 10/0631 709/217 |
| 2015/0180915 A1* | 6/2015 | Mitchell et al. | 715/753 |

FOREIGN PATENT DOCUMENTS

| | | |
|---|---|---|
| JP | 2000-105647 A | 4/2000 |
| JP | 2004-325806 | 11/2004 |
| JP | 2007-286780 | 11/2007 |
| JP | 2009-64241 | 3/2009 |
| JP | 2010-108261 A | 5/2010 |
| JP | 2010-114721 A | 5/2010 |

OTHER PUBLICATIONS

Office Action (Notice of Reasons for Refusal) issued on Jun. 30, 2015, by the Japanese Patent Office in corresponding Japanese Patent Application No. 2012-202474, and an English translation of the Office Action (6 pages).

* cited by examiner

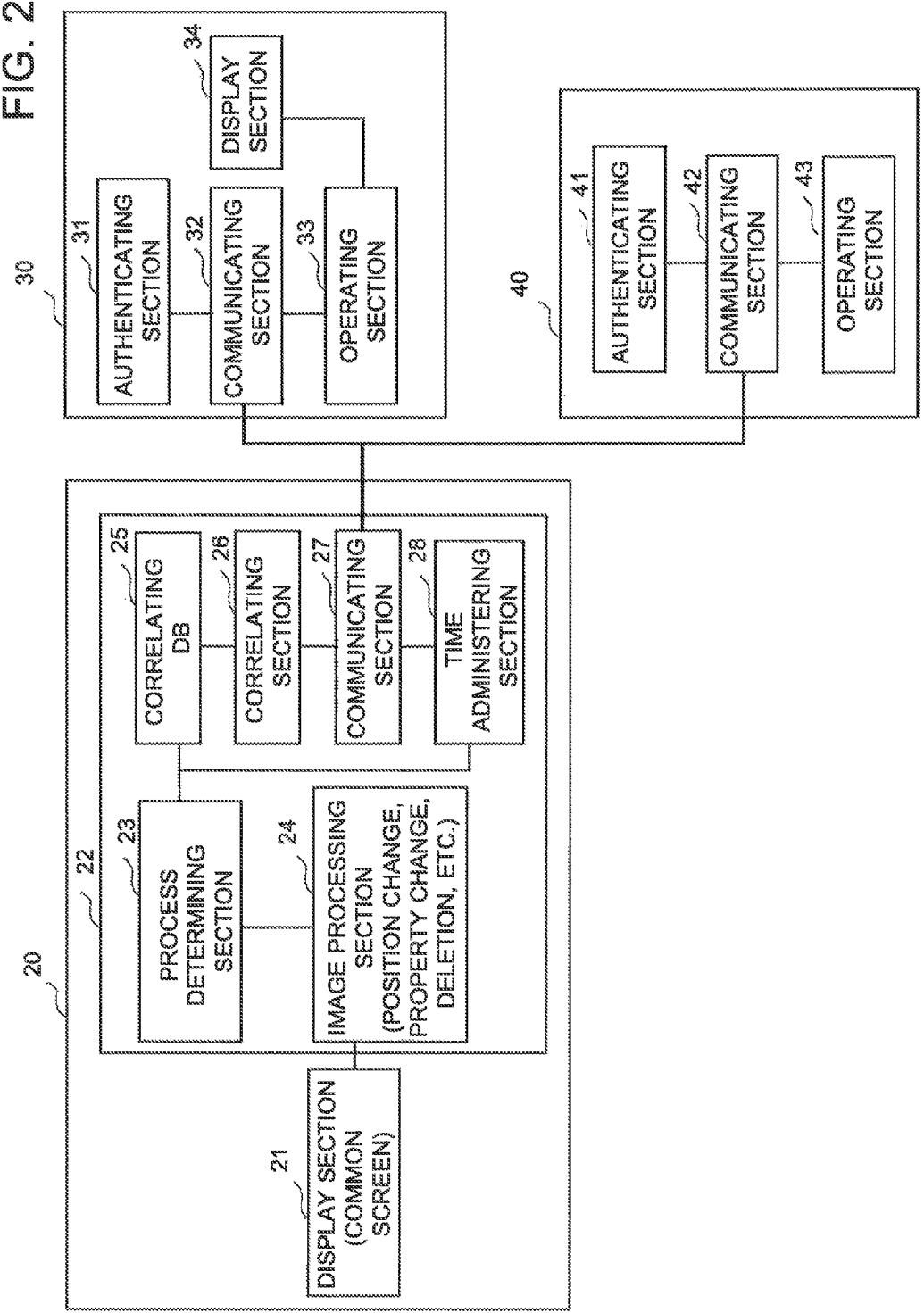

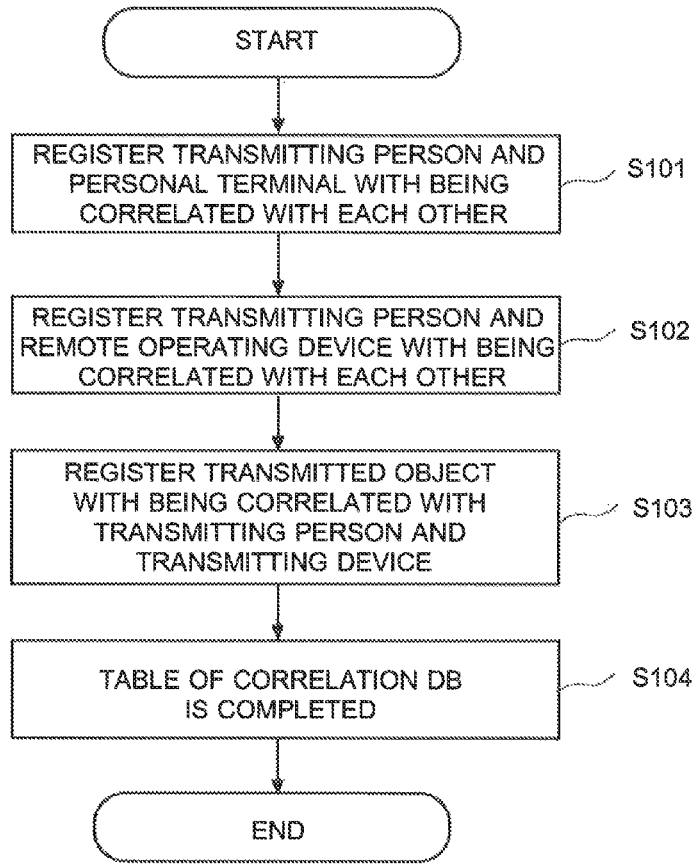

INFORMATION SHARING SYSTEM, COMMON TERMINAL AND NON-TRANSITORY COMPUTER-READABLE STORAGE MEDIUM

This application is based on Japanese Patent Application No. 2012-202474 filed on Sep. 14, 2012, in the Japan Patent Office, the entire content of which is hereby incorporated by reference.

TECHNICAL FIELD

The present invention relates to an information sharing system, a common terminal, and a non-transitory computer-readable storage medium storing an information sharing control program. In particular, the present invention relates to an information sharing system configured to share information transmitted from a personal terminal by displaying the information on a common terminal, a common terminal configured to control a remote operation on the information transmitted from a personal terminal, and a non-transitory computer-readable storage medium storing an information sharing control program.

BACKGROUND

In recent years, with the spread of mobile terminals, such as portable computers and tablet terminals, an electronic conference has become to be held in the following manners. Users are allowed to input information regarding the conference by using their own mobile terminals, and the input information is displayed on a common screen. Then, while each of users is looking the information displayed on the common screen, the conference is made to progress.

For example, Japanese Unexamined Patent Publication (JP-A) No, 2007-286780 discloses an electronic conference system which includes a display device; a portable memory device configured to record contents written on an entry surface as image data; a reading device configured to read the image data recorded in the portable memory device; and a display control device configured to incorporate the image data read by the reading device as tag image data into image data to be displayed on the display device and to display the resulting data on the display device.

In such an electronic conference, users are allowed to edit information displayed on a common screen by performing a remote operation from their respective mobile terminals, whereby the discussion can be made efficiently. However, if two or more users perform remote operations simultaneously for the same information from their respective mobile terminals, the remote operations compete to each other. As a result, a problem arises in that it becomes difficult to judge which information is the newest information. Accordingly, in the electronic conference, there exists a necessity to control operations not to compete to each other.

With regard to a technique to prevent such competition among operations, for example, JP-A No. 2009-064241 discloses a document administering device configured to administer a registration form memorized in a registration form memory device. The document administering device includes a judging section configured to judge whether the registration fat in or a file correlated with the registration form is in the course of editing; and a restricting section configured to prohibit editing for the whole of the registration form or the file correlated with the registration form by other users when the registration form or the file correlated with the registration form is being edited.

The JP-A No. 2009-064241 discloses a technique to prevent competition among operations at the time of editing the registration form or the file correlated with the registration form. Since the form is registered in the state of having been prepared to a certain degree, the editing seldom becomes necessary immediately after the registration. Accordingly, in the case of the registration form and the file, if a certain user is in the course of editing, an editing operation by the other users may be prohibited. Even if an editing right is controlled to be given to the first person who has started editing first, there is no problem.

On the other hand, in the electronic conference, users tend to input coming-up information such as sudden ideas at any time into their own mobile terminals so as to display the information on a common screen. Accordingly, in many cases, the editing becomes necessary immediately after the information has been displayed. For example, since the display pattern of information on the screen of the mobile terminal of each of the users is different from that on the common screen, the transmitting person of the information may desire to change the display size, display color, or display position of the information after having transmitted the information. Further, the administrator of the electronic conference also may desire to change the display size, display color, or display position of the displayed information in order to match it with the other information. Furthermore, if the displayed information is improper, the transmitting person of the information or the administrator of the electronic conference may desire to delete the information.

In such a case, as with the JP-A No. 2009-064241, if an editing right is made to be given to the first person who has started editing first, a person (the transmitting person of the information and the administrator) who is intrinsically to be permitted to perform editing becomes unable to perform the editing. Accordingly, there has been a problem that information cannot be shared in an appropriate state. The present invention seeks to solve the problem.

SUMMARY

There are disclosed illustrative image sharing systems, common terminals and non-transitory computer-readable storage media each storing a information sharing control program.

An illustrative information sharing system reflecting one aspect of the present invention is an information sharing system comprising: a common terminal configured to display a plurality of objects on a common screen; and one or more personal terminals connected to the common terminal through a network, each configured to transmit an object to the common terminal and perform a remote operation on an object displayed on the common screen. The common terminal comprises a receiving section configured to receive an object transmitted from one of the one or more personal terminals, and a display section including the common screen and being configured to, upon the receiving section receiving the object transmitted from the one of the one or more personal terminals, display the object on the common screen. The common terminal further includes a control section. The control section is configured to determine, upon the receiving section receiving an instruction transmitted from an instructing terminal being one of the one or more personal terminals, whether the instruction satisfies a predetermined condition or not, where the instruction is an instruction to perform a remote operation on an instructed object being an object which has been displayed on the common screen through the display section. Further, the control section is configured to prohibit performing the remote operation, in response to a determination that the instruction does not satisfy the predetermined condition.

An illustrative common terminal reflecting another aspect of the present invention is a common terminal which is configured to display a plurality of objects transmitted from one or more personal terminals on a common screen and allow the one or more personal terminals to perform a remote operation on the objects. The common terminal comprises a receiving section configured to receive an object transmitted from one of the one or more personal terminals, and a display section including the common screen and being configured to, upon the receiving section receiving the object transmitted from the one of the one or more personal terminals, display the object on the common screen. The common terminal further comprises a control section. The control section is configured to determine, upon the receiving section receiving an instruction transmitted from an instructing terminal being one of the one or more personal terminals, whether the instruction satisfies a predetermined condition or not, where the instruction is an instruction to perform a remote operation on an instructed object being an object which has been displayed on the common screen through the display section. The control section is configured to prohibit performing the remote operation, in response to a determination that the instruction does not satisfy the predetermined condition.

An illustrative non-transitory computer-readable storage medium reflecting another aspect of the present invention is a non-transitory computer-readable storage medium storing an information sharing control program to be executed in a common terminal. The common terminal includes a common screen configured to display a plurality of objects transmitted from one or more personal terminals. The common terminal allows the one or more personal terminals to perform a remote operation on the objects. The program causes a processor of the common terminal to perform processes including: receiving an object transmitted from one of the one or more personal terminals; upon the receiving the object transmitted from the one of the one or more personal terminals, operating the common screen to display the object; and performing a control operation. The performing a control operation includes determining, upon receiving an instruction transmitted from an instructing terminal being one of the one or more personal terminals, whether the instruction satisfies a predetermined condition or not, where the instruction is an instruction to perform a remote operation on an instructed object being an object which has been displayed on the common screen through the display section. The performing a control operation further includes prohibiting performing the remote operation, in response to a determination that the instruction does not satisfy the predetermined condition.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 2 is a block diagram illustrating the structure of each device of the information sharing system pertaining to one embodiment of the present invention;

FIG. 3 is a flowchart diagram illustrating a preparation procedure of a correlation table pertaining to one embodiment of the present invention;

FIG. 4 illustrates an example of the correlation table pertaining to one embodiment of the present invention;

DETAILED DESCRIPTION

Figure 1:
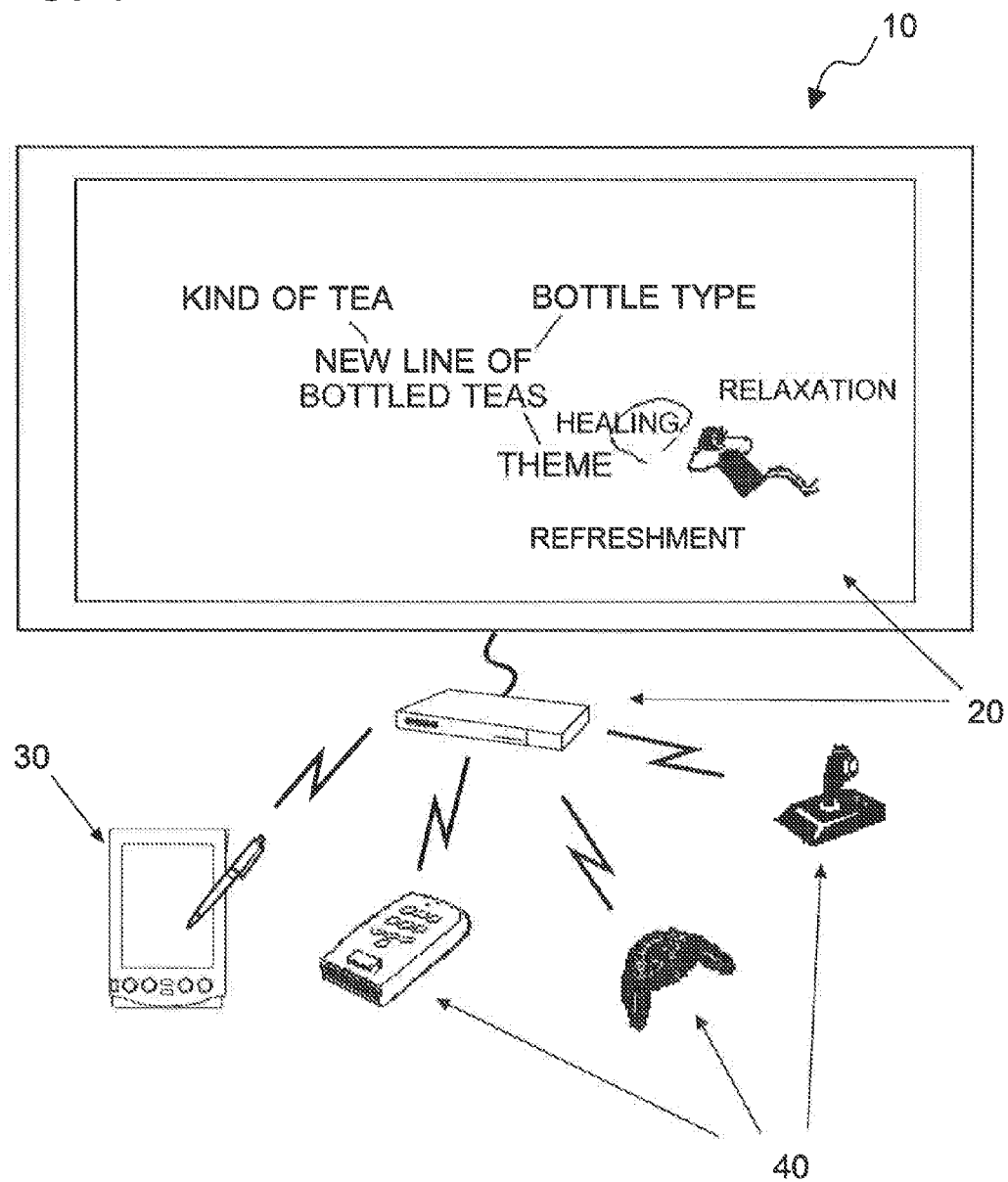
FIG. 1 is a diagram schematically illustrating the structure of an information sharing system pertaining to one embodiment of the present invention.

Illustrative embodiments of information sharing systems, common terminals and non-transitory computer-readable storage media each storing an information sharing control program will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to the information sharing systems, common terminals, and non-transitory computer-readable storage media each storing an information sharing control program as embodiments of the present invention, in the case where two or more users share information, operations for the information do not compete with each other, and the information can be shared in an appropriate state, because of the following reasons.

There is provided an information sharing system in which a common terminal and one or more personal terminals are connected to each other via a network and a remote control for an object displayed on a common screen of the common terminal can be performed by one of the one or more personal terminal. When the common terminal receives the data of an object from one of the one or more personal terminals, the common terminal displays the object on the common screen and prohibits an unspecified user from performing a remote operation on the object until a prescribed condition is satisfied.

As illustrated in the description about the background, according to some proposed systems, various kinds of information such as characters, drawings, and images (they are collectively called "object") created by respective mobile terminals (called "personal terminal") used by two or more users are displayed on a common screen of a terminal (called "common terminal") shared by the users. In this system, since a display pattern of the screen of a personal terminal is different from that of the common screen of the common terminal, at the time of transmitting an object, the display position and properties (size, color, style, and the like) of the object and, if the object includes texts, the font of the texts displayed on the common screen may be considered not to be proper. In such a case, it is necessary to enable a user to change the position and properties of the Object after the object has been transmitted. Further, if the object has been transmitted by mistake, it is necessary to enable a user to delete the object.

At the time of such object editing, when two or more persons perform their operations, problems arise in that the operations may be compete with each other and it becomes difficult to judge which information is the newest information. As a method for avoiding the problem of competition, the JP-A No. 2009-064241 discloses a technique to transfer a right to perform an operation explicitly to a certain user and to allow the user to perform the operation exclusively. According to this technique, users other than the first user who has started editing first cannot perform an operation on the object, which causes a situation that a person (the transmitting person of the information and the administrator) who is intrinsically to be permitted to perform editing becomes unable to perform the editing. Accordingly, there has been a problem that information is hardly shared in an appropriate state.

In view of the problem, in one embodiment of the present invention, a transmitting person having transmitted an object, the transmitted object, a personal terminal used for the transmitting, and, if needed, a device (a personal terminal, a remote control device, a motion sensor, an eye tracking device, a brain machine interface, and the like) to perform a remote operation on the object are correlated with each other and registered with the correlation information. Based on the correlation information, only a specific user (a transmitting person of the object and/or an administrator) is permitted to perform a remote operation on the object. Further, the time within which a remoter operation is permitted to the specific user is limited to a predetermined time, and if the predetermined time elapses, the other users utilizing the object are also permitted to perform a remote operation on the object.

Thus, only a specific user is permitted to perform a remote operation on an object within a prescribed time after the object has been transmitted, whereby, for example, the unification of objects, the arrangement and classification of information, and the like can be performed efficiently. Further, a specific user is provided with an operating right within a prescribed time, and thereafter, the operating right are admitted for users other than the specific user, whereby the problem of competition can be avoided while maintaining the degree of freedom for the remote operation.

EXAMPLES

Figure 5:
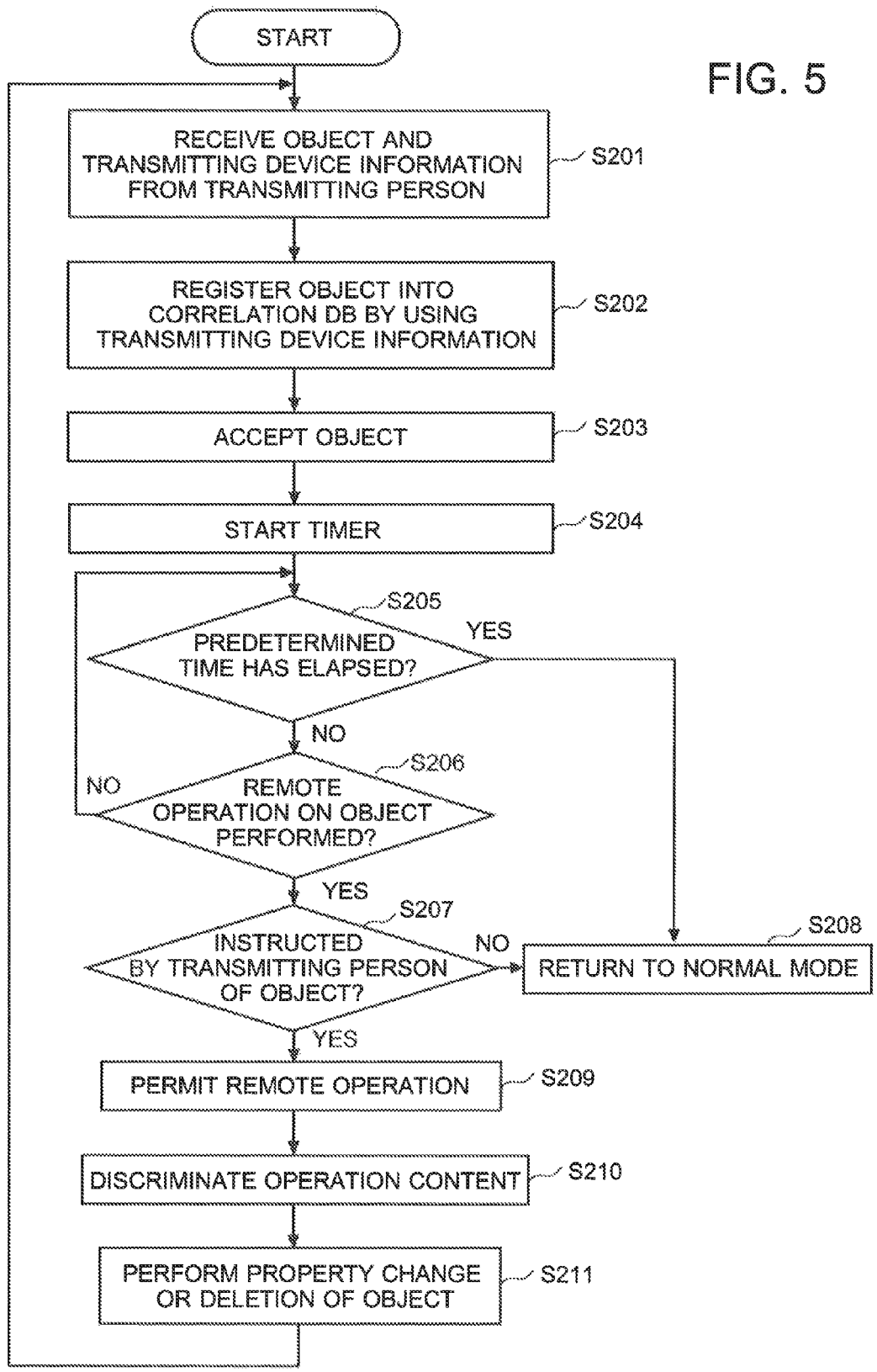
FIG. 5 is a flowchart diagram illustrating the operations of a common terminal pertaining to one embodiment of the present invention.

In order to describe the above-mentioned embodiment of the present invention more in detail, description will be given to an information sharing system, a common terminal, and a non-transitory computer-readable storage medium storing an information sharing control program of one example of the present invention with reference to FIGS. 1 to 6E. FIG. 1 is a diagram schematically illustrating the structure of an information sharing system of the present example, and FIG. 2 is block diagram illustrating the structure of each device of the information sharing system. Further, FIG. 3 is a flowchart diagram illustrating a preparation procedure of a correlation table of the present example, and FIG. 4 illustrates an example of the correlation table. Furthermore, FIG. 5 is a flowchart diagram illustrating the operations of a common terminal of the present example, and FIGS. 6A to 6E illustrate examples of editing operations for objects.

As shown in FIG. 1, the information sharing system 10 of the present example includes a common terminal 20 which includes a common screen on which two or more objects can be arranged and a control section configured to control objects on the common screen; a personal terminal(s) 30 configured to perform transmission and edit of an object; and remote operating devices (also referred as operation terminals) 40 configured to perform edit of an object. The common terminal 20 and the personal terminal 30 (and the remote operating devices 40) are connected to each other via a cable or wireless.

Here, the term "object" in the present example is a general term for characters, figures, images, and the like displayed on the common screen, and includes information input directly from the common terminal 20 and information transmitted from the personal terminal 30 to the common terminal 20.

Further, the term "edit of an object" and "to edit an object" is a general term for operations, such as an operation to shift an object on the common screen, an operation to change a display pattern of an object (in size, color, style, font, and the like), and an operation to delete an object.

FIG. 2 is a block diagram showing the structure of each device of the above-mentioned information sharing system 10. Hereafter, each device will be described in detail.

Common Terminal:

The common terminal 20 is a display device to allow two or more users to browse objects, and includes a display section (common screen) 21 and the control section 22.

The display section 21 includes a device (a common screen) such as an LCD (Liquid Crystal Display) and an organic electroluminescence display, which is configured to display objects in accordance with instructions of the control section 22. Further, if needed, the common terminal 20 includes a touch panel constituted by lattice-shaped transparent electrodes on the display section 21. The touch panel allows users to input objects thereon. The touch panel may employ a multi-touch system configured to perform detection via infrared light.

The control section 22 includes a CPU (Central Processing Unit) as a processor, a storage section, such as a ROM (Read Only Memory), a RAM (Random Access Memory), and a HDD (Hard Disk Drive), and a communicating section, such as a MC (Network Interface Card) and a modem. This control section 22 is configured to function as a process determining section 23, an image processing section 24, a correlating DB 25, a correlating section 26, a communicating section 27, a time administering section 28, and the like.

The process determining section 23 is configured to determine permission/prohibition of edit of an object based on the correlation table registered in the correlation DB 25.

When the process determining section 23 permits the edit of an object, the image processing section 24 performs image processing, such as a position change of the object on the display section (common screen) 21, a property change of the object, and deletion of the object in accordance with instructing information of the edit transmitted from the personal terminal 30 and/or the remote operating device 40.

The correlation DB 25 is configured to memorize a correlation table in which an object, a user having transmitted the object, a personal terminal 30 having transmitted the object, and a terminal (a personal terminal 30 and/or a remote operating device 40) instructing the edit of the object are correlated with each other.

The correlating section 26 is configured to correlate a user and a terminal (a personal terminal 30 and/or a remote operating device 40) which the user is using. Further, when an object has been transmitted from a personal terminal 30, the correlating section 26 correlates the object and a corresponding user based on (by utilizing) the device information transmitted together with the object. The correlating section 26 registers these correlation data to form a correlation table in the correlation DB 25.

The communicating section (a receiving section) 27 is configured to receive an object from a personal terminal 30, and to receive instructing information of edit of an object from a personal terminal 30 and/or a remote operating device 40. Further, the communicating section 27 is configured to transmit objects displayed on the display section (common screen) 21 to each personal terminal 30.

The time administering section 28 is composed of a device such as a timer, and is configured to administer (monitor) an elapsed time after receiving an object from a personal terminal 30, and to determine permission/prohibition of the edit of the object based on a comparison result between the elapsed time and a prescribed time previously determined.

Here, the above-mentioned sections such as the process determining section 23, image processing section 24, correlating section 26, and time administering section 28 may be constituted as software (an information sharing control program) which is stored in the storage section, such as a ROM, a RAM, and a HDD (Hard Disk Drive) and executed by the processor in the control section 22, or may be constituted as hardware.

Personal Terminal:

The personal terminal 30 may be one of a portable computer device, a tablet terminal, a PDA (Personal Digital Assistants), a smart phone, and the like, and includes an authenticating section 31, a communicating section 32, an operating section 33, a display section 34, and the like.

The authenticating section 31 is configured to authenticate a user who uses the personal terminal 30. Examples of authenticating methods include a method of comparing authentication information such as an ID, a password, and the like, input by using the operating section 33 with the preliminarily-memorized authentication information; a method of reading information written in a RFID (Radio Frequency Identification) tag and comparing the read information with the preliminarily-memorized authentication information; a method of reading the biological information (a fingerprint, a vein pattern, or the like) of a user and comparing the read information with the preliminarily-memorized authentication information; and a method of photographing the face of a user and comparing the photographed image with the preliminarily-memorized image.

The communicating section 32 is composed of a device such as an NIC and a modem, and is configured to transmit an object, instructing information of edit of the object, device information of the personal terminal 30, user information acquired by the authenticating section 31, and the like to the control section 22 of the common terminal 20.

The operating section 33 includes devices such as a touch panel constituted by lattice-shaped transparent electrodes arranged on the display section 34, a hard key, and the like, and is configured to allow a user to perform an operation to create an object, a remote operation to edit an object, and the like. Examples of the remote operating methods include a method of designating a direction desired to shift an object by using a shift cross key which is displayed on the screen of the personal terminal 30; a method of instructing the shift of an object by stroking (swiping) an object with a finger; and a method of instructing property change or deletion of an object by selecting a menu from menus displayed on the screen of the personal terminal 30. Further, with a method of utilizing a gyro sensor and inclining the personal terminal 30, it becomes possible to perform menu selection such as shift, property change and deletion of an object. Furthermore, with an object operating section physically disposed on the personal terminal 30, it becomes possible to perform menu selection such as shift, property change and deletion of an object by using buttons or levers.

The display section 34 is composed of a device such as a LCD, an organic electroluminescence display, and the like, and is configured to display a screen on which Objects are browsed or operated. Here, the display section 34 may be made to display the same content with that on the common screen of the common terminal 20 or to display a different content from that on the common screen. In the case of displaying the same content with that on the common screen, when an object is operated by the operating section 33, the content on the common screen may be made to change in synchronization with the operation.

Remote Operating Device:

The remote operating device 40 may be a remote controller, a joy stick, or the like, and includes an authenticating section 41, a communicating section 42, an operating section 43, and the like.

The authenticating section 41 is configured to authenticate a user who uses the remote operating device 40. Examples of authenticating methods include, similarly to the above, a method of comparing authentication information such as an ID, a password, and the like, input by using the operating section 43 with the preliminarily-memorized authentication information; a method of reading information written in a RFID tag and comparing the read information with the preliminarily-memorized authentication information; and a method of reading the biological information of a user and comparing the read information with the preliminarily-memorized authentication information.

The communicating section 42 is composed of a device such as an NIC, modem, and the like, and is configured to transmit the edit instructing information of an object, the device information of the remote operating device 40, user information acquired by the authenticating section 41, and the like to the control section 22 of the common terminal 20.

The operating section 43 includes devices such as levers, buttons, a cross key, and the like, and is configured to allow an operator to perform a remote operation to edit an object displayed on the common terminal (common screen) 20. As the remote operating methods, a gyro sensor, eye tracking, brain waves, and the like may be utilized. Further, an operator may perform a remote operation by using, for example, a motion sensor and voice recognition without holding a specific device.

Here, FIG. 2 shows an example of the information sharing system 10 of the present embodiment, and its constitution and control may be changed appropriately. For example, in FIG. 2, the display section 21 and the control section 22 are incorporated in the common terminal 20. However, the display section 21 and the control section 22 may be provided as separated devices so as to form the common terminal 20. Further, in the present example, the remote operating device 40 being different from a personal terminal 30 which has transmitted an object is allowed to perform a remote operation for the object. However, in the case where only one or more personal terminals 30 are allowed to perform a remote operation on the object, the remote operating device 40 may also be omitted.

Next, description will be given to a procedure for registering a correlation table by using the information sharing system 10 with the above-mentioned structure with reference to a flowchart diagram shown in FIG. 3.

First, the authenticating section 31 of the personal terminal 30 authenticates a user who operates the personal terminal 30, and transmits device information of the personal terminal 30 and user information of the authenticated user to the common terminal 20 through the communicating section 32. Upon receipt of these pieces of information through the communicating section 27, the control section 22 (correlating section 26) of the common terminal 20 correlates the user information of the transmitting person with the device information of the personal terminal 30 and registers them as the correlated information (S101).

Next, the authenticating section 41 of the remote operating device 40 authenticates a user who operates the remote operating device 40, and transmits device information of the remote operating device 40 and user information of the authenticated user to the common terminal 20 through the communicating section 42. Upon receipt of these pieces of information through the communicating section 27, the control section 22 (correlating section 26) of the common terminal 20 further correlates the device information of the remote operating device 40 with the information correlated at S1.01 by utilizing the user information of the transmitting person regarding the remote operating device (S102). Here, in the case where the remote operating device 40 is not used, this process may be omitted.

Next, as mentioned later, the user creates an object in the personal terminal 30, and when transmitting the object to the common terminal 20, the user transmits the device information of the personal terminal 30 by accompanying it with the object. Upon receipt of these pieces of information through the communicating section 27, the control section 22 (correlating section 26) of the common terminal 20 further correlates the object with the information correlated at S101 or, in addition, with the information correlated at S102 by utilizing the device information of the personal terminal 30 (S103).

By the above processes, a correlation table to be memorized in the correlation DB 25 has been completed (S104). FIG. 4 shows an example of the correlation table. In this example, in the state that a user "A" as a transmitting person and "PERSONAL TERMINAL 1" as a transmitting device are correlated with each other, when an object titled "NEW LINE OF BOTTLED TEAS" is transmitted by using the personal terminal 1, the object is correlated with the transmitting person "A". Further, in the state that a user "B" as a transmitting person, "PERSONAL TERMINAL 2" as a transmitting device, and "REMOTE OPERATING DEVICE 1" as a way to perform remote operation are correlated with each other, when an object titled "THEME" and an object titled "HEALING" are transmitted by using the personal terminal 2, each of the objects is correlated with the transmitting person "B". Items of the way to perform a remote operation in the correlation table include, for example, pieces of information about a personal terminal, a remote control device, a motion sensor, an eye tracking device, a brain machine interface, and the like.

Here, in the above-mentioned flow, the transmitting person and the personal terminal 30 are correlated with each other, and further, the remote operating device 40 is correlated with them. Thereafter, the object is correlated with them. However, the order of correlation should not be limited to that in the above-mentioned flow. For example, a transmitting person and a personal terminal 30 are correlated with each other, and further, an object may be correlated with them. Thereafter, a remote operating device 40 may be correlated with them.

Further, in the present example, the authenticating section is disposed in each of the personal terminal 30 and the remote operating device 40. However, the user information of a transmitting person and the device information of the personal terminal 30 (and the remote operating device 40) may be input manually into the common terminal 20. In this case, it may be permissible for the personal terminal 30 (and the remote operating device 40) to transmit only the device information. Accordingly, the authenticating section may be omitted.

Furthermore, in the present example, as a user to perform a remote operation, only a transmitting person is registered. However, an administrator (for example, a superior of a group to perform a conference) may be registered. In this case, when an object is registered, the administrator and a personal terminal 30 and remote operating device 40 used by the administrator may be correlated with the object and registered in a correlation table.

Moreover, in the present example, a transmitting person is registered in the correlation table. However, in the case where each user uses one's own personal terminal 30 and the remote operating device 40 is not used, only a personal terminal 30 and an object may be registered in a correlation table.

Hereafter, description will be given to a procedure to perform remote operations for an object by utilizing the above-mentioned correlation table with reference to a flowchart diagram shown in FIG. 5.

A user creates an object with a personal terminal 30, and transmits the created object and device information of the personal terminal 30 to the common terminal 20. Upon receipt of the object from the personal terminal 30 (S201), as mentioned above, the control section 22 (correlating section 26) of the common terminal 20 registers the object into the correlation DB 25 by utilizing the device information of the personal terminal 30 (S202). Then, the control section 22 (image processing section 24) accepts the received object, performs image processing, and displays the object on the display section 21 (S203).

Next, in order to administer the time for remote operations, the control section 22 (time administering section 28) starts a timer (S204), and judges whether a previously-determined prescribed time has elapsed after receiving the object (S205). If the prescribed time has elapsed, the flow returns to a normal mode (S208). This normal mode is a mode in which all the users who are sharing the object are allowed to perform a remote operation for the object. Alternately, the normal mode may be made a mode in which a remote operation on the object is prohibited and only an input made by touching directly the display section 21 of the common terminal 20 is permitted.

On the other hand, if the prescribed time has not elapsed, the control section 22 (process determining section 23) judges whether a remote operation on the object is performed in the personal terminal 30 or the remote operating device 40 (whether the control section receives instructing information of edit of an object) (S206). If a remote operation on the object is not performed (the control section does not receive the instruction information to edit an object), the flow returns to S205 and the elapsed time is monitored.

When a remote operation on an object is performed (the control section receives the instruction information to edit of an object), the control section 22 (correlating section 26) discriminates whether a user instructing to perform the remote operation is the transmitting person of the object (or the administrator), with reference to the correlation table registered in the correlation DB 25 (S207). In concrete terms, when the device information of the personal terminal 30 or the remote operating device 40 transmitted together with the instruction information to edit an object is registered by being correlated with the object, the control section 22 judges such that the user instructing to perform the remote operation is the transmitting person of the object (or the administrator). At this time, when the user instructing to perform the remote operation is a user other than the transmitting person of the object (or the administrator), the flow returns a normal mode (S208).

Figure 6A:
FIGS. 6A to 6E illustrate examples of editing operations on objects pertaining to one embodiment of the present invention.
Figure 6B:
Figure 6C:
Figure 6D:
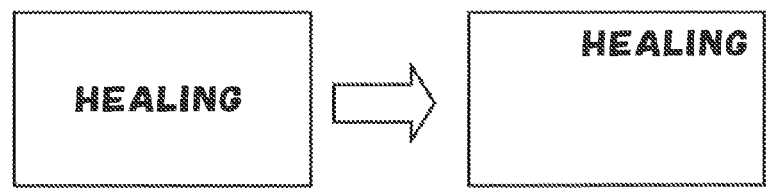
Figure 6E:
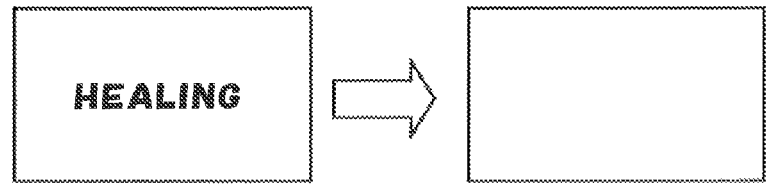

On the other hand, when the user instructing to perform the remote operation is the transmitting person of the object (or the administrator), the control section 22 (process determining section 23) permits the remote operation (S209). Successively, the control section 22 discriminates the operation content performed by the personal terminal 30 or the remote operating device 40 based on the instruction information of the edit (S210). For example, the control section 22 (process determining section 23) discriminates an operation to change the display size of the object as shown in FIG. 6A, an operation to change the display color of the object as shown in FIG. 6B (in which colors are represented by gray scales), an operation to change the font of characters in the object as shown in FIG. 6C, an operation to change the display position of the object as shown in FIG. 6D, and an operation to delete the object as Shown in FIG. 6E.

Subsequently, the control section 22 (image processing section 24) performs an operation such as position changing, property changing, deletion, and the like on the object in accordance with the operation discriminated by the process determining section 23 (S211) so as to reflect the operation result on the display section 21.

Although the prescribed time in the above S205 may be a fixed time, the prescribed time may be changed in accordance with the number of objects transmitted from the personal terminal 30. For example, in the case where two or more objects are transmitted serially or simultaneously from the personal terminal 30, since the transmitting person needs time to consider how to edit the transmitted objects, the time administering section 28 may control to prolong the prescribed time in accordance with the number of objects.

Further, in the above-mentioned flow, in the case the position changing, the property changing, or the deletion is performed on the object at S211 in response to the reception of the remote operation, after the remote operation on the object has been completed, the flow is made to return to S201. However, there may be a case where the object having been subjected to the edit is desired to be further subjected to position changing, property changing, or deletion. In such a case, the flow may be configured such that after position changing, property changing, or deletion has been performed on the object, the flow is made to return to S204 or S205 so as to allow remote operations to be performed many times until the prescribed time elapses.

Further, depending on the content of a conference (for example, a conference aimed at putting forward various possible ideas), if a remote operation by users other than the transmitting person or the administrator is prohibited until the prescribed time elapses, the progress of the conference may be interfered. Furthermore, depending on the content of an object (for example, in the case of a long description), it may be difficult to complete the edit of an object within a prescribed time. In such a case, it may be permissible that the transmitting person or the administrator is allowed to change the prescribed time appropriately. For example, when an object is transmitted from a personal terminal 30 to the common terminal 20, the instructing information to change the prescribed time is transmitted to the common terminal 20. Successively, the time administering section 28 changes the prescribed time in accordance with the instructing information. Further, an operation to change the prescribed time is performed on the common screen, and then, the time administering section 28 changes the prescribed time in accordance with the change operation.

On the other hand, if the change of the prescribed time becomes possible as mentioned above, users other than the transmitting person and the administrator become unable to know what time the edit of the object becomes possible, which is inconvenient. Then, in order to enable all the readers of the object to grasp the status regarding the remote operation, the image processing section 24 acquires the elapsed time or the remaining time until reaching the prescribed time from the time administering section 28, and displays them on the common screen. In addition, the image processing section 24 can notify them to the respective personal terminals 30 of the readers through the communicating section 27 so as to enable the respective display sections 34 of the personal terminals 30 to display them.

The present invention should not be limited to the above-mentioned examples. Namely, the constitution and control in the embodiments may be modified appropriately, unless the modification deviates from the intention of the present invention.

For example, in the above-mentioned example, the transmitting person of the object or the administrator is permitted to perform a remote operation on the object by using the personal terminal 30 or the remote operating device 40 each registered beforehand until the prescribed time elapses. However, since the object and the user are correlated with each other in the correlation table, the following manner may be set up. That is, the user information is transmitted together with the instructing information to perform the edit of the object, and when the user is correlated with the object in the correlation table, the user is permitted to perform a remote operation.

Further, in the above-mentioned example, the transmitting person of the object or the administrator is permitted to perform a remote operation on the object until the prescribed time elapses. However, in the present invention, it is permissible to control a remote operation on an object to be permitted for only a specific person or terminal until a prescribed condition is satisfied. Accordingly, the specific person should not be limited to the transmitting person or the administrator, and the specific terminal should not be limited to the terminal which the transmitting person or the administrator operates.

Furthermore, in the above-mentioned example, a specific single user is permitted to perform a remote operation for an object. However, the right to perform a remote operation for an object may be given to both of the transmitting person of the object and the administrator. In this case, if the respective operations of them compete to each other, a previously-stated remote operation may be made to be valid. Further, if the respective remote operations of them are instructed simultaneously, the both may be made to be invalid.

The invention claimed is:
1. An information sharing system comprising:
a common terminal configured to display a plurality of objects on a common screen; and
one or more personal terminals connected to the common terminal through a network, each configured to transmit an object to the common terminal and perform a remote operation on an object displayed on the common screen,
wherein the common terminal comprises:
a display section including the common screen and being configured to display the object on the common screen, and
a processor configured to:
receive an object transmitted from one of the one or more personal terminals,
determine, upon receiving an instruction transmitted from an instructing terminal being one of the one or more personal terminals, whether the instruction satisfies a predetermined condition or not, the instruction being an instruction to perform a remote operation on an instructed object being an object which has been displayed on the common screen through the display section, and
prohibit performing the remote operation, in response to a determination that the instruction does not satisfy the predetermined condition, wherein the predetermined condition is an amount of time that has elapsed from when the object is first displayed on the common screen.

2. The information sharing system of claim 1, wherein the processor is configured to:
   register device information and user information as being correlated with each other into a table, the device information representing each of the one or more personal terminals, the user information representing a user operating the each of the one or more personal terminals,
   register, upon receiving the object transmitted from the one of the one or more personal terminals and device information of the one of the one or more personal terminals, the object transmitted from the one of the one or more personal terminals into the table by using the device information of the one of the one or more personal terminals,
   determine, upon receiving the instruction transmitted from the instructing terminal, whether information regarding the instructing terminal is registered in the table as being correlated with the instructed object or not, the information regarding the instructing terminal being one of device information of the instructing terminal and user information of a user operating the instructing terminal, and
   permit the remote operation on the instructed object to be performed, in response to a determination that the information regarding the instructing terminal is registered in the table as being correlated with the instructed object.

3. The information sharing system of claim 2, further comprising an operation terminal being different from the one or more personal terminals, the operation terminal being connected to the network and being configured to perform a remote operation on an object displayed on the common screen,
   wherein the processor is configured to:
   register device information of the operation terminal and user information of a user operating the operation terminal as being correlated with each other into the table,
   determine, upon receiving the instruction transmitted from an instructing terminal being the operation terminal, whether information regarding the instructing terminal is registered in the table as being correlated with the instructed object or not, the information regarding the instructing terminal being one of device information of the instructing terminal as the operation terminal and user information of a user operating the instructing terminal as the operation terminal, and
   permit the remote operation on the instructed object to be performed, in response to a determination that the information regarding the instructing terminal is registered in the table as being correlated with the instructed object.

4. An information sharing system comprising:
   a common terminal configured to display a plurality of objects on a common screen; and
   one or more personal terminals connected to the common terminal through a network, each configured to transmit an object to the common terminal and perform a remote operation on an object displayed on the common screen,
   wherein the common terminal comprises:
   a display section including the common screen and being configured to display the object on the common screen, and
   a processor configured to:
   register device information and user information as being correlated with each other into a table,
   receive an object transmitted from one of the one or more personal terminals,
   determine, upon receiving an instruction transmitted from an instructing terminal being one of the one or more personal terminals, whether the instruction satisfies a predetermined condition or not, the instruction being an instruction to perform a remote operation on an instructed object being an object which has been displayed on the common screen through the display section,
   prohibit performing the remote operation, in response to a determination that the instruction does not satisfy the predetermined condition,
   after receiving the object transmitted from the one of the one or more personal terminal, monitor time which has elapsed before receiving an instruction transmitted from the instructing terminal, the instruction being an instruction to perform a remote operation on the object transmitted from the one of the one or more personal terminal, and
   permit the remote operation on the object transmitted from the one of the one or more personal terminal to be performed, under a condition that the elapsed time is a predetermined time or less, the remote operation being instructed by one of the instructing terminal and an user operating the instructing terminal which are registered in the table as being correlated with the object transmitted from the one of the one or more personal terminal.

5. The information sharing system of claim 4, wherein the processor is configured to, on receiving a plurality of objects transmitted from one of the one or more personal terminals, change the predetermined time according to the number of the plurality of objects.

6. The information sharing system of claim 4, wherein the processor is configured to display the elapsed time or a remaining time to reach the predetermined time, on the common screen.

7. The information sharing system of claim 1, wherein the remote operation is an operation to change an object displayed on the common screen in one of a display position, a display size, a display color and a font, or an operation to delete an object displayed on the common screen.

8. A common terminal which is configured to display a plurality of objects transmitted from one or more personal terminals on a common screen and allow the one or more personal terminals to perform a remote operation on the objects, the common terminal comprising:
   a display section including the common screen and being configured to display the objects on the common screen; and
   a processor configured to:
   receive an object transmitted from one of the one or more personal terminals,
   determine, upon receiving an instruction transmitted from an instructing terminal being one of the one or more personal terminals, whether the instruction satisfies a predetermined condition or not, the instruction being an instruction to perform a remote operation on an instructed object being an object which has been displayed on the common screen through the display section, and prohibit performing the remote operation, in response to a determination that the instruction does not satisfy the predetermined condition, wherein the predetermined condition is an amount of time that has elapsed from when the object is first displayed on the common screen.

9. The common terminal of claim 8, wherein the processor is configured to:

register device information and user information as being correlated with each other into a table, the device information representing each of the one or more personal terminals, the user information representing a user operating the each of the one or more personal terminals, register, upon receiving the object transmitted from the one of the one or more personal terminals and device information of the one of the one or more personal terminals, the object transmitted by the one of the one or more personal terminals into the table by using the device information of the one of the one or more personal terminals, determine, upon receiving the instruction transmitted by the instructing terminal, whether information regarding the instructing terminal is registered in the table as being correlated with the instructed object or not, the information regarding the instructing terminal being one of device information of the instructing terminal and user information of a user operating the instructing terminal, and permit the remote operation on the instructed object to be performed, in response to a determination that the information regarding the instructing terminal is registered in the table as being correlated with the instructed object.

10. The common terminal of claim 9, wherein the processor is configured to:

register device information of an operation terminal and user information of a user operating the operation terminal as being correlated with each other into the table, the operation terminal being different from the one or more personal terminal and being configured to perform a remote operation on an object displayed on the common screen, determine, upon receiving the instruction transmitted by an instructing terminal being the operation terminal, whether information regarding the instructing terminal is registered in the table as being correlated with the instructed object or not, the information regarding the instructing terminal being one of device information of the instructing terminal as the operation terminal and user information of a user operating the instructing terminal as the operation terminal, and permit the remote operation on the instructed object to be performed, in response to a determination that the information regarding the instructing terminal is registered in the table as being correlated with the instructed object.

11. A common terminal which is configured to display a plurality of objects transmitted from one or more personal terminals on a common screen and allow the one or more personal terminals to perform a remote operation on the objects, the common terminal comprising:

a display section including the common screen and being configured to display the objects on the common screen; and a processor configured to:

register device information and user information as being correlated with each other into a table, receive an object transmitted from one of the one or more personal terminals, determine, upon receiving an instruction transmitted from an instructing terminal being one of the one or more personal terminals, whether the instruction satisfies a predetermined condition or not, the instruction being an instruction to perform a remote operation on an instructed object being an object which has been displayed on the common screen through the display section, prohibit performing the remote operation, in response to a determination that the instruction does not satisfy the predetermined condition, after receiving the object transmitted from the one of the one or more personal terminal, monitor time which has elapsed before receiving an instruction transmitted from the instructing terminal, the instruction being an instruction to perform a remote operation on the object transmitted from the one of the one or more personal terminal, and permit the remote operation on the object transmitted from the one of the one or more personal terminal to be performed, under a condition that the elapsed time is a predetermined time or less, the remote operation being instructed by one of the instructing terminal and an user operating the instructing terminal which are registered in the table as being correlated with the object transmitted from the one of the one or more personal terminal.

12. The common terminal of claim 11, wherein the processor is configured to, on receiving a plurality of objects transmitted from one of the one or more personal terminals, change the predetermined time according to the number of the plurality of objects.

13. The common terminal of claim 11, wherein the processor is configured to display the elapsed time or a remaining time to reach the predetermined time, on the common screen.

14. The common terminal of claim 8, wherein the remote operation is an operation to change an object displayed on the common screen in one of a display position, a display size, a display color and a font, or an operation to delete an object displayed on the common screen.

15. A non-transitory computer-readable medium storing an information sharing control program to be executed in a common terminal, the common terminal including a common screen configured to display a plurality of objects transmitted from one or more personal terminals, the common terminal allowing the one or more personal terminals to perform a remote operation on the objects, the program causing a processor of the common terminal to perform processes including:

receiving an object transmitted from one of the one or more personal terminals;

upon the receiving the object transmitted from the one of the one or more personal terminals, displaying the object on the common screen; and performing a control operation including determining, upon receiving an instruction transmitted from an instructing terminal being one of the one or more personal terminals, whether the instruction satisfies a predetermined condition or not, the instruction being an instruction to perform a remote operation on an instructed object being an object which has been displayed on the common screen through the display section, and prohibiting performing the remote operation, in response to a determination that the instruction does not satisfy the predetermined condition, wherein the predetermined condition is an amount of time that has elapsed from when the object is first displayed on the common screen.

16. The non-transitory computer-readable medium of claim 15,
wherein the performing the control operation including:
registering device information and user information as being correlated with each other into a table, the device information representing each of the one or more personal terminals, the user information representing a user operating the each of the one or more personal terminals,
registering, upon receiving the object transmitted from the one of the one or more personal terminals and device information of the one of the one or more personal terminals, the object transmitted from the one of the one or more personal terminals into the table by using the device information of the one of the one or more personal terminals,
determining, upon receiving the instruction transmitted from the instructing terminal, whether information regarding the instructing terminal is registered in the table as being correlated with the instructed object or not, the information regarding the instructing terminal being one of device information of the instructing terminal and user information of a user operating the instructing terminal, and
permitting the remote operation on the instructed object to be performed, in response to a determination that the information regarding the instructing terminal is registered in the table as being correlated with the instructed object.

17. The non-transitory computer-readable medium of claim 16,
wherein the performing the control operation including:
registering device information of an operation terminal and user information of a user operating the operation terminal as being correlated with each other into the table, the operation terminal being different from the one or more personal terminal and being configured to perform a remote operation on an object displayed on the common screen,
determining, upon receiving the instruction transmitted from an instructing terminal being the operation terminal, whether information regarding the instructing terminal is registered in the table as being correlated with the instructed object or not, the information regarding the instructing terminal being one of device information of the instructing terminal as the operation terminal and user information of a user operating the instructing terminal as the operation terminal, and
permitting the remote operation on the instructed object to be performed, in response to a determination that the information regarding the instructing terminal is registered in the table as being correlated with the instructed object.

18. A non-transitory computer-readable medium storing an information sharing control program to be executed in a common terminal, the common terminal including a common screen configured to display a plurality of objects transmitted from one or more personal terminals, the common terminal allowing the one or more personal terminals to perform a remote operation on the objects, the program causing a processor of the common terminal to perform processes including:
registering device information and user information as being correlated with each other into a table,
receiving an object transmitted from one of the one or more personal terminals;
upon the receiving the object transmitted from the one of the one or more personal terminals, displaying the object on the common screen; and
determining, upon receiving an instruction transmitted from an instructing terminal being one of the one or more personal terminals, whether the instruction satisfies a predetermined condition or not, the instruction being an instruction to perform a remote operation on an instructed object being an object which has been displayed on the common screen through the display section, and
prohibiting performing the remote operation, in response to a determination that the instruction does not satisfy the predetermined condition,
after receiving the object transmitted from the one of the one or more personal terminal, monitoring time which has elapsed before receiving an instruction transmitted from the instructing terminal, the instruction being an instruction to perform a remote operation on the object transmitted from the one of the one or more personal terminal, and
permitting the remote operation on the object transmitted from the one of the one or more personal terminal to be performed, under a condition that the elapsed time is a predetermined time or less, the remote operation being instructed by one of the instructing terminal and an user operating the instructing terminal which are registered in the table as being correlated with the object transmitted from the one of the one or more personal terminal.

19. The non-transitory computer-readable medium of claim 18,
wherein the performing the control operation includes, on receiving a plurality of objects transmitted from one of the one or more personal terminals, changing the predetermined time according to the number of the plurality of objects.

20. The non-transitory computer-readable medium of claim 18,
wherein the performing the control operation includes displaying the elapsed time or a remaining time to reach the predetermined time, on the common screen.

21. The non-transitory computer-readable medium of claim 15,
wherein the remote operation is an operation to change an object displayed on the common screen in one of a display position, a display size, a display color and a font, or an operation to delete an object displayed on the common screen.

* * * * *